(12) United States Patent
Yokota

(10) Patent No.: US 9,194,320 B2
(45) Date of Patent: Nov. 24, 2015

(54) FUEL TANK SYSTEM

(71) Applicant: HONDA MOTOR CO., LTD, Tokyo (JP)

(72) Inventor: Tomonori Yokota, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 294 days.

(21) Appl. No.: 13/956,464

(22) Filed: Aug. 1, 2013

(65) Prior Publication Data

US 2014/0041632 A1 Feb. 13, 2014

(30) Foreign Application Priority Data

Aug. 9, 2012 (JP) ................. 2012-176590

(51) Int. Cl.
*F02D 41/22* (2006.01)
*F02M 69/02* (2006.01)
*F02M 37/00* (2006.01)
*B60K 15/04* (2006.01)
*B60K 15/03* (2006.01)

(52) U.S. Cl.
CPC .......... *F02D 41/221* (2013.01); *B60K 15/0409* (2013.01); *F02D 41/22* (2013.01); *F02D 41/222* (2013.01); *F02M 37/0076* (2013.01); *F02M 69/02* (2013.01); *B60K 2015/03197* (2013.01); *B60K 2015/03203* (2013.01); *B60K 2015/03375* (2013.01); *B60K 2015/0416* (2013.01)

(58) Field of Classification Search
CPC .. F02M 37/0076; F02D 41/222; F02D 41/22; F02D 41/221
USPC ....... 123/446, 479, 480, 198 D; 701/114, 102
See application file for complete search history.

(56) References Cited

FOREIGN PATENT DOCUMENTS

| JP | 08074683 A | * | 3/1996 |
| JP | 2003-002399 A | | 1/2003 |
| JP | 2004156497 A | * | 6/2004 |
| JP | 2012172561 A | * | 9/2012 |

* cited by examiner

*Primary Examiner* — Mahmoud Gimie
(74) *Attorney, Agent, or Firm* — Westerman, Hattori, Daniels & Adrian, LLP

(57) ABSTRACT

A fuel tank system includes an ECU receiving an open signal Sa of a fuel supply SW. The ECU has a main control unit controlling a power unit of a vehicle, a main relay control circuit turning off a main relay when IGSW for causing the power unit to start or stop is turned off, SOAK time measurement circuit measuring an input time and no input time, the input time being a time during which the open signal Sa is continuously inputted to the ECU while the IGSW is off, the no input time being a time during which the open signal Sa is not inputted to the ECU while the IGSW is off with the fuel supply SW on, and a failure determination unit determining that the fuel supply SW has an abnormality when SOAK time is longer than a failure determination time.

9 Claims, 17 Drawing Sheets

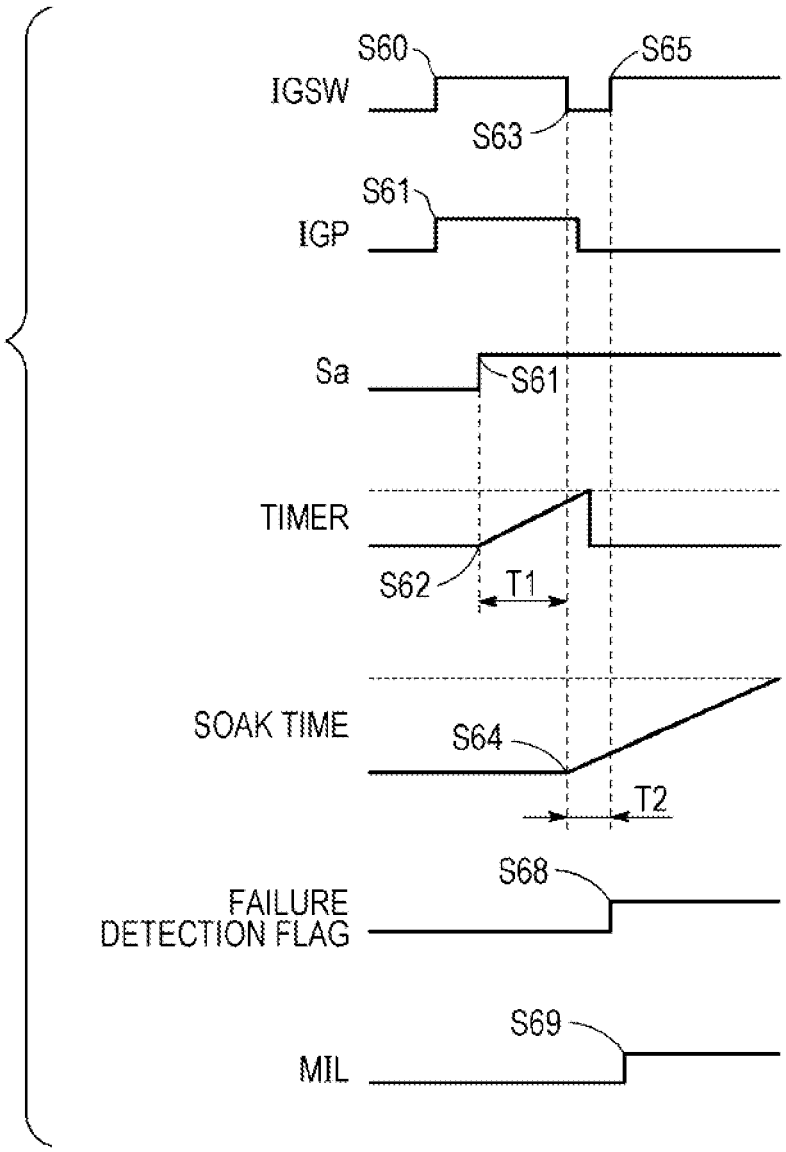

FUEL TANK SYSTEM

CROSS REFERENCES TO RELATED APPLICATIONS

The present application claims priority under 35 U.S.C. §119 to Japanese Patent Application No. 2012-176590, filed Aug. 9, 2012, entitled "Fuel Tank System." The contents of this application are incorporated herein by reference in their entirety.

TECHNICAL FIELD

The present disclosure relates to a fuel tank system provided with a fuel supply switch for opening a lid member which closes a fuel supply port of a fuel tank.

BACKGROUND

A fuel tank system has been known in which a lid disposed in a fuel tank is opened by turning on a fuel supply switch at the time of fuel supply.

In this type of fuel tank system, a technical idea has been proposed in which an ECU measures a time period in which a signal has been outputted from the fuel supply switch with the fuel supply switch ON, and when the measured time is longer than a preset time, the fuel supply switch is determined to have an abnormality (for example, see Japanese Unexamined Patent Application Publication No. 2003-2399).

SUMMARY

However, in the related art as in Japanese Unexamined Patent Application Publication No. 2003-2399, measurement by the ECU is made impossible when an ignition switch is turned off before the signal output time of the fuel supply switch reaches the preset time, and thus an abnormality of the fuel supply switch may not be detected at an early stage.

The present disclosure has been made in consideration of such a problem, and provides a fuel tank system which can detect an abnormality of a fuel supply switch even when an ignition switch is off, and thus an abnormality of the fuel supply switch can be detected at an early stage.

[1] A fuel tank system according to the present disclosure includes: a fuel tank which stores fuel; a lid member which closes a fuel supply port of the fuel tank; a fuel supply switch for opening the lid member; and a control device which controls and allows the lid member to be opened based on an open signal outputted from the fuel supply switch when the fuel supply switch is turned on. The control device includes a main control unit which controls a power unit in a vehicle, a switching control unit capable of interrupting an electric connection between a power supply and the main control unit when an ignition switch for causing the machine to start or stop is turned off, a first timer capable of measuring an input time period and no input time period, the input time period being a time period during which the open signal is continuously inputted to the control device while the ignition switch is off, the no input time period being a time period during which the open signal is not inputted to the control device continuously while the ignition switch is off with the fuel supply switch on, and an abnormality determination unit which determines that the fuel supply switch has an abnormality when a measured time by the first timer is longer than a first determination time.

With the fuel tank system according to the present disclosure, even when the ignition switch is turned off, the input time period or the no input time period of the open signal of the fuel supply switch is measured by the first timer, and when the measured time by the first timer is longer than the first determination time period, the fuel supply switch is determined to have an abnormality, and thus an abnormality (fixed ON state abnormality or fixed OFF state abnormality) of the fuel supply switch can be detected (determined) at an early stage.

Here, the fixed ON state abnormality is, for example, an abnormal condition in which the fuel supply switch is fixed in ON state, so that the open signal Sa is continuously inputted to the control device, or an abnormal condition in which wiring of the fuel supply switch is short-circuited, so that the open signal Sa is continuously inputted to the control device even when the fuel supply switch is in OFF state.

Here, the fixed OFF state abnormality is an abnormal condition in which the open signal is not inputted to the control device even when the fuel supply switch is in ON state because, for example, the fuel supply switch is fixed in OFF state, wiring of the fuel supply switch is disconnected, or wiring of the fuel supply switch is short-circuited.

[2] In the fuel tank system, the control device preferably has a second timer capable of measuring the input time period and the no input time period of the open signal while the ignition switch is on, when the ignition switch is turned off before a measured time by the second timer reaches a second determination time period, the switching control unit may interrupt the connection after the measured time exceeds the second determination time period, and the abnormality determination unit may determine that the fuel supply switch has an abnormality when the measured time by the second timer is longer than the second determination time period.

With the above configuration, when the ignition switch is turned off before the time (an input time period or no input time period of the open signal) measured by the second timer reaches the second determination time, electric connection between the power supply and the main control unit is interrupted after the measured time exceeds the second determination time period, and thus even when the ignition switch is turned off, interruption of power supply to the main control unit can be preferably prevented in the middle of measuring the input time period or the no input time period by the second timer. Consequently, for example, even when the abnormality determination unit or the like is provided in the main control unit, an abnormality of the fuel supply switch can be detected at an early stage.

[3] In the fuel tank system, the control device preferably has an insufficient time calculation unit which calculates an insufficient time for the measured time by the second timer with respect to the second determination time period when the ignition switch is turned off, and an extension time to be extended after the ignition switch is turned off until the connection is interrupted may be set to a time corresponding to the insufficient time calculated by the insufficient time calculation unit.

With the above configuration, the driving time of the main control unit while the ignition switch is off can be reduced as much as possible because the extension time to be extended after the ignition switch is turned off until the switching control unit interrupts the connection is set to the time corresponding to the insufficient time calculated by the insufficient time calculation unit. Consequently, electric power consumption of the power supply can be preferably reduced.

[4] In the fuel tank system, the control device preferably has a second timer which measures the input time period and the no input time period of the open signal while the ignition switch is on, and in the case where the ignition switch is turned off before the measured time by the second timer reaches a second determination time period, the abnormality determination unit may determine that the fuel supply switch has an abnormality when a total measured time period of the measured time period by the first timer and the measured time period by the second timer immediately after the turn off is longer than a third determination time period.

With the above configuration, when the ignition switch is turned off before the time measured by the second timer reaches the preset time, the abnormality determination unit determines that the fuel supply switch has an abnormality when the total measured time period of the measured time period by the first timer and the measured time period by the second timer immediately after the turn off is longer than the third determination time period, and thus an abnormality of the fuel supply switch can be detected efficiently at an early stage.

[5] In the fuel tank system, the control unit may determine that the fuel supply switch is normal in the case where the open signal is not inputted to the control device when the ignition switch is again turned on after the fuel supply switch is determined to have an abnormality.

With the above configuration, the main control unit determines that the fuel supply switch is normal in the case where the open signal is not inputted to the control device when the ignition switch is again turned on after the fuel supply switch is determined to have an abnormality, and thus an erroneous determination of abnormality of the fuel supply switch can be prevented. In addition, power supply to the main control unit, which performs abnormality determination, is not necessary while the ignition switch is off, and thus power consumption can be reduced.

BRIEF DESCRIPTION OF THE DRAWINGS

The advantages of the disclosure will become apparent in the following description taken in conjunction with the following drawings.

FIG. 17 is a timing chart for explaining the failure detection control according to the third embodiment.

DETAILED DESCRIPTION

Hereinafter, a fuel tank system according to the present disclosure will be described in detail with reference to the accompanying drawings by illustrating a preferable embodiment in view of a vehicle in which the fuel tank system is incorporated.

First Embodiment

Figure 1:
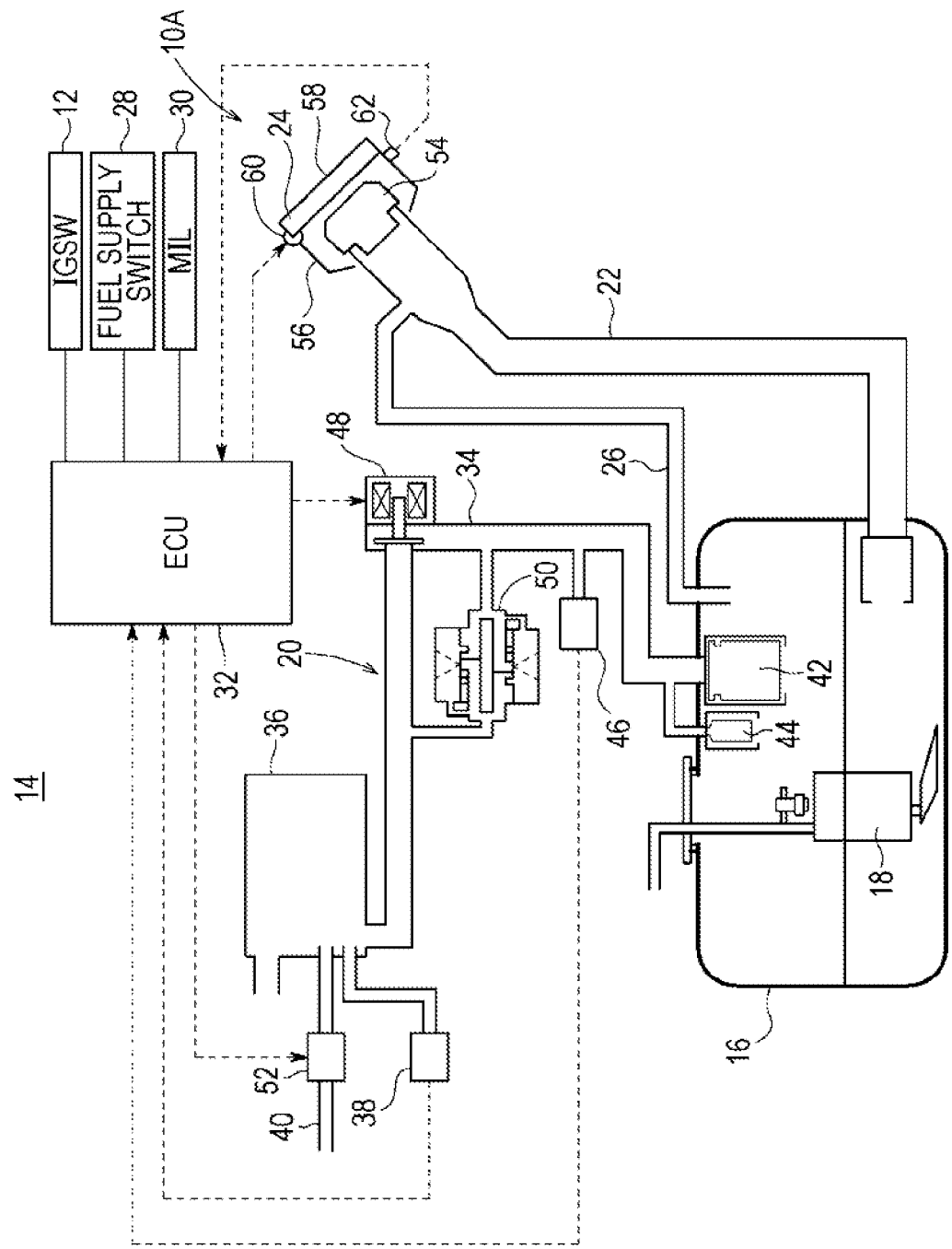
FIG. 1 is a schematic configuration diagram of a fuel tank system according to a first embodiment of the present disclosure.

As illustrated in FIG. 1, a fuel tank system 10A according to a first embodiment of the present disclosure is applied to a vehicle 14 which has an ignition switch 12 for starting or stopping a power unit (an internal-combustion engine or an electric machine such as a motor) which is not illustrated. The fuel supply switch 28 is provided for opening a lid member 24 which closes a fuel supply port of a fuel tank 16. The fuel tank system 10A is for detecting a failure (abnormality) of a fuel supply switch 28 while the ignition switch 12 is off.

The fuel tank system 10A includes a fuel tank 16 in which liquid fuel (hereinafter simply referred to as fuel) is stored, a fuel pump 18 for guiding fuel to an internal-combustion engine which is not illustrated, an evaporated fuel treatment unit 20 for treating evaporated fuel of the fuel tank 16, a filler pipe 22 for supplying fuel into the fuel tank 16, a lid member 24 which is provided in the filler pipe 22 to close a fuel supply port of the fuel tank 16, a breather pipe 26 which connects between the fuel tank 16 and a portion of the filler pipe 22 near the lid member 24, a fuel supply switch (fuel supply SW) 28 for opening the lid member 24, an indicator lamp (MIL) 30 for informing a driver of abnormality of the fuel supply SW 28, and an electronic control unit (ECU) 32 as a control device.

The evaporated fuel treatment unit 20 has a vapor passage 34 into which evaporated fuel generated in the fuel tank 16 is guided, a canister 36 which contains adsorption materials such as activated carbon which adsorbs the evaporated fuel guided by the vapor passage 34, a pressure sensor 38 which detects a pressure in the canister 36, and a purge passage 40 which guides the evaporated fuel adsorbed by the canister 36 together with the outside air to the internal-combustion engine.

The vapor passage 34 is provided with a float valve 42 and a cut valve 44 which are disposed in the fuel tank 16, a pressure sensor 46 which detects a pressure in the fuel tank 16, a control valve 48 which is located nearer to the canister 36 than the pressure sensor 46, and a high pressure 2-way valve 50 which is disposed in parallel to the control valve 48. The signals detected by the pressure sensor 38 and the pressure sensor 46 are outputted to the ECU 32.

The float valve 42 closes the vapor passage 34 so as to prevent fuel from flowing into the vapor passage 34 in a so-called full tank condition. The cut valve 44 prevents fuel from flowing into the vapor passage 34, for example, when the fuel tank 16 is inclined. The cut valve 44 is configured not to close the vapor passage 34 in the so-called full tank condition.

For example, a normally-closed electromagnetic valve can be used as the control valve 48. For example, a mechanical valve in combination of diaphragm positive and negative pressure valves can be used as the high pressure 2-way valve 50. The purge passage 40 is provided with, for example, a purge control valve 52 including an electromagnetic valve.

The lid member 24 has a filler cap 54 which is provided in the filler pipe 22 so as to close the fuel supply port of the fuel tank 16, a fuel lid 58 which is openably attached to a support 56 supporting the filler pipe 22 so as to cover the filler cap 54, a fuel lid lock 60 which can lock the fuel lid 58 in a closed position, and a lid open/close sensor 62 which detects an open/close state of the fuel lid 58. A signal detected by the lid open/close sensor 62 is outputted to the ECU 32.

The lid member 24 may be an open-close valve which is directly provided in the filler pipe 22. In this case, opening and closing of the open-close valve is controlled by the ECU 32.

Figure 2:
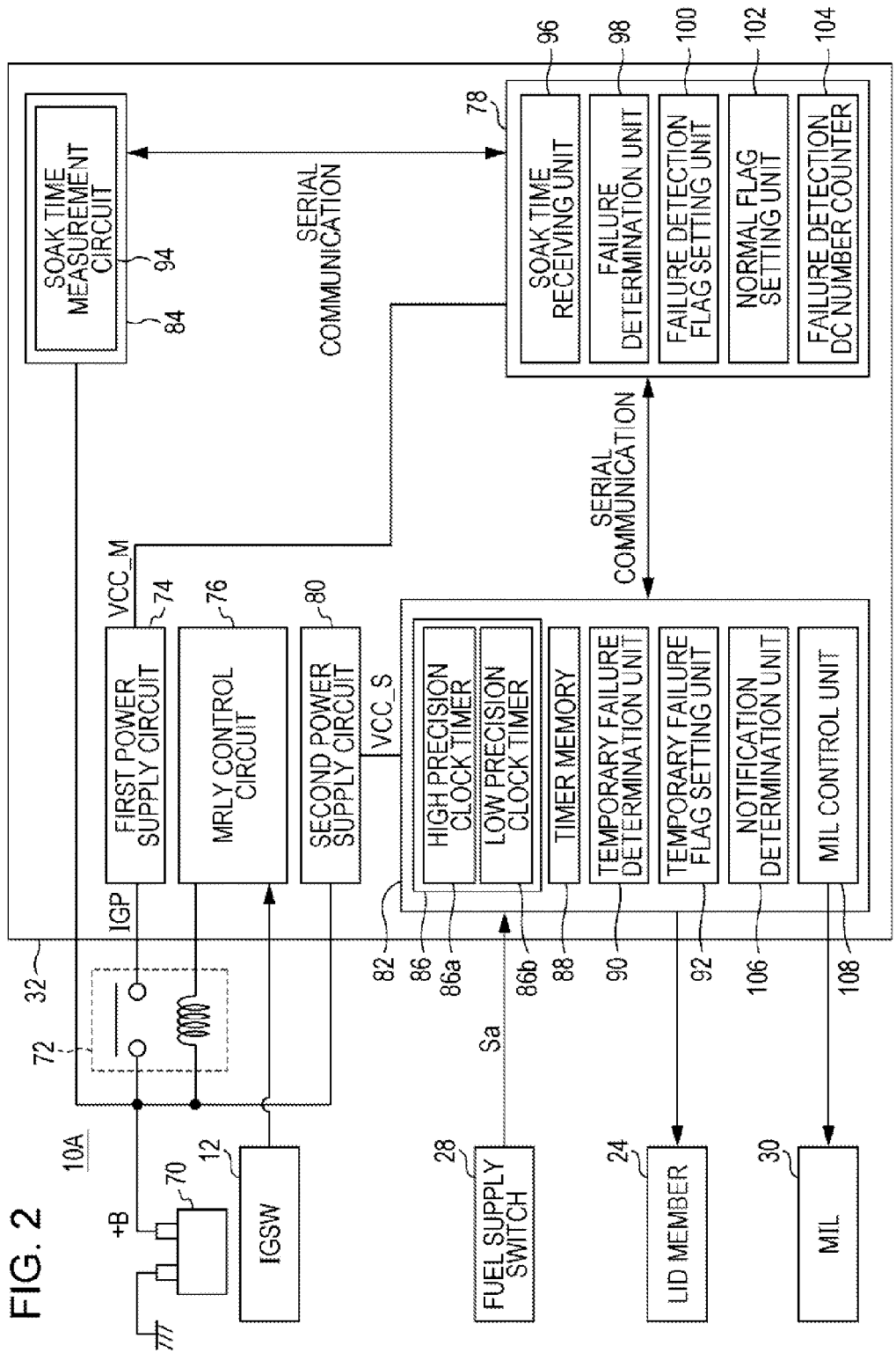
FIG. 2 is a block diagram of an ECU illustrated in FIG. 1.

As illustrated in FIG. 2, the fuel supply SW 28 is disposed, for example, in the vicinity of a driver's seat (not illustrated) so as to allow the driver to perform on-off operation of the fuel supply SW 28. The fuel supply SW 28 continuously outputs an open signal Sa to the ECU 32 while the fuel supply SW 28 is on.

An electric power (IGP) having a predetermined voltage (+B) is supplied from a battery (power supply) 70 provided in a vehicle 14 to the ECU 32 via a main relay (MAIN RLY) 72. The ECU 32 includes a first power supply circuit 74 which outputs electric power having a constant voltage VCC_M, a main relay control circuit (MRLY control circuit, switching control unit) 76 for controlling the main relay 72, a main control unit (MainCPU, microcomputer) 78 to which the electric power outputted from the first power supply circuit 74 is supplied, a second power supply circuit 80 to which electric power having a predetermined voltage is supplied from the battery 70 and which outputs electric power having a constant voltage VCC_S, a sub control unit (SubCPU) 82 to which the electric power outputted from the second power supply circuit 80 is supplied, and a custom IC 84 to which electric power having a predetermined voltage is supplied from the battery 70.

The main relay control circuit 76 turns on the main relay 72 when an IGSW 12 is turned on so as to supply the electric power IGP of the battery 70 to the first power supply circuit 74, and turns off the main relay 72 when the IGSW 12 is turned off so as to interrupt the supply of the electric power IGP from the battery 70 to the first power supply circuit 74 (electrical connection between the battery 70 and the first power supply circuit 74 is interrupted).

In the present embodiment, the main relay control circuit 76 is configured to turn off the main relay 72 when a predetermined time elapses after the IGSW 12 is turned off. In this case, failure diagnosis of the fuel tank 16 can be performed in the main control unit 78 during the predetermined time after the IGSW 12 is turned off.

The main control unit 78 drive-controls the above-mentioned power unit, and is configured to be communicable (for example, serially communicable) with each of the sub control unit 82 and the custom IC 84. The detailed configuration of the main control unit 78 will be described below.

Irrespective of ON/OFF of the IGSW 12, the sub control unit 82 is constantly energized to be in ON state, and when an open signal Sa outputted from the fuel supply SW 28 is inputted, the sub control unit 82 releases the lock of the fuel lid lock 60 included in the lid member 24 to allow the fuel lid 58 to be opened.

The sub control unit 82 has a timer (second timer) 86, a timer memory 88, a temporary failure determination unit 90, and a temporary failure flag setting unit 92.

In the present embodiment, the timer 86 measures a time (first input time) T1 during which the open signal Sa is continuously inputted to the ECU 32 while the IGSW 12 is on. The timer 86 includes a high speed clock timer 86a which has a higher count number per unit time, and a low speed clock timer 86b which has a lower count number per unit time.

The sub control unit 82 drives the high speed clock timer 86a only in ON state of the IGSW 12, and drives the low speed clock timer 86b only in OFF state of the IGSW 12. In other words, the power consumption of the ECU 32 can be preferably reduced because the high speed clock timer 86a and the low speed clock timer 86b are switched according to an ON or OFF state of the IGSW 12. The high speed clock timer 86a is also used to execute various applications of the main control unit 78 at high speed.

The timer memory 88 stores the first input time T1 which is measured by the timer 86. The temporary failure determination unit 90 determines whether or not the first input time T1 stored in the timer memory 88 exceeds a predetermined temporary failure determination time Ta. The temporary failure flag setting unit 92 sets a temporary failure flag based on a result determined by the temporary failure determination unit 90.

Similarly to the sub control unit 82, the custom IC 84 is constantly energized to be in ON state irrespective of the ON/OFF of the IGSW 12. The custom IC 84 has a SOAK time measurement circuit (first timer) 94 which measures a time (SOAK time) T2 between the time when the IGSW 12 is turned off and the time when the IGSW 12 is turned on subsequently.

The main control unit 78 has a SOAK time receiving unit 96, a failure determination unit (abnormality determination unit) 98, a failure detection flag setting unit 100, a normal flag setting unit 102, and a failure detection DC number counter 104.

The SOAK time receiving unit 96 receives a SOAK time T2 which has been serially transmitted from the SOAK time measurement circuit 94 of the custom IC 84.

The failure determination unit 98 determines whether or not the SOAK time T2 exceeds a predetermined failure determination time (first determination time) Tb. When the open signal Sa continues to be inputted to the ECU 32 during a time period after the IGSW 12 is turned off and until the IGSW 12 is turned on subsequently, the SOAK time T2 is equivalent to an input time (second input time) of the open signal Sa to the ECU 32 while the IGSW 12 is off.

The failure detection flag setting unit 100 sets a failure detection flag based on a result determined by the failure determination unit 98. The normal flag setting unit 102 sets a normal flag when abnormality of the fuel supply SW 28 is not recognized.

The failure detection DC number counter 104 counts the number of driving cycles in which the failure detection flag is set. The driving cycle is a time period in which the IGSW 12 is turned on, turned off once, and turned on again.

The sub control unit 82 further includes a notification determination unit 106 which determines whether or not the failure detection DC number counter 104 has counted a predetermined number-of-times (for example, twice) successively, and an MIL control unit 108 which lights on or off an MIL 30 based on a result determined by the notification determination unit 106.

In the fuel tank system 10A, fixed ON state abnormality of the fuel supply SW 28 may occur. Here, the fixed ON state abnormality is, for example, an abnormal condition in which the fuel supply SW 28 is fixed in ON state, so that the open signal Sa is continuously inputted to the ECU 32, or an abnormal condition in which wiring of the fuel supply SW 28 is short-circuited, so that the open signal Sa is continuously inputted to the ECU 32 even when the fuel supply SW 28 is in OFF state.

However, in the fuel tank system 10A according to the present embodiment, such a fixed ON state abnormality can be reliably detected (determined) even when the IGSW 12 is off.

Figure 3:
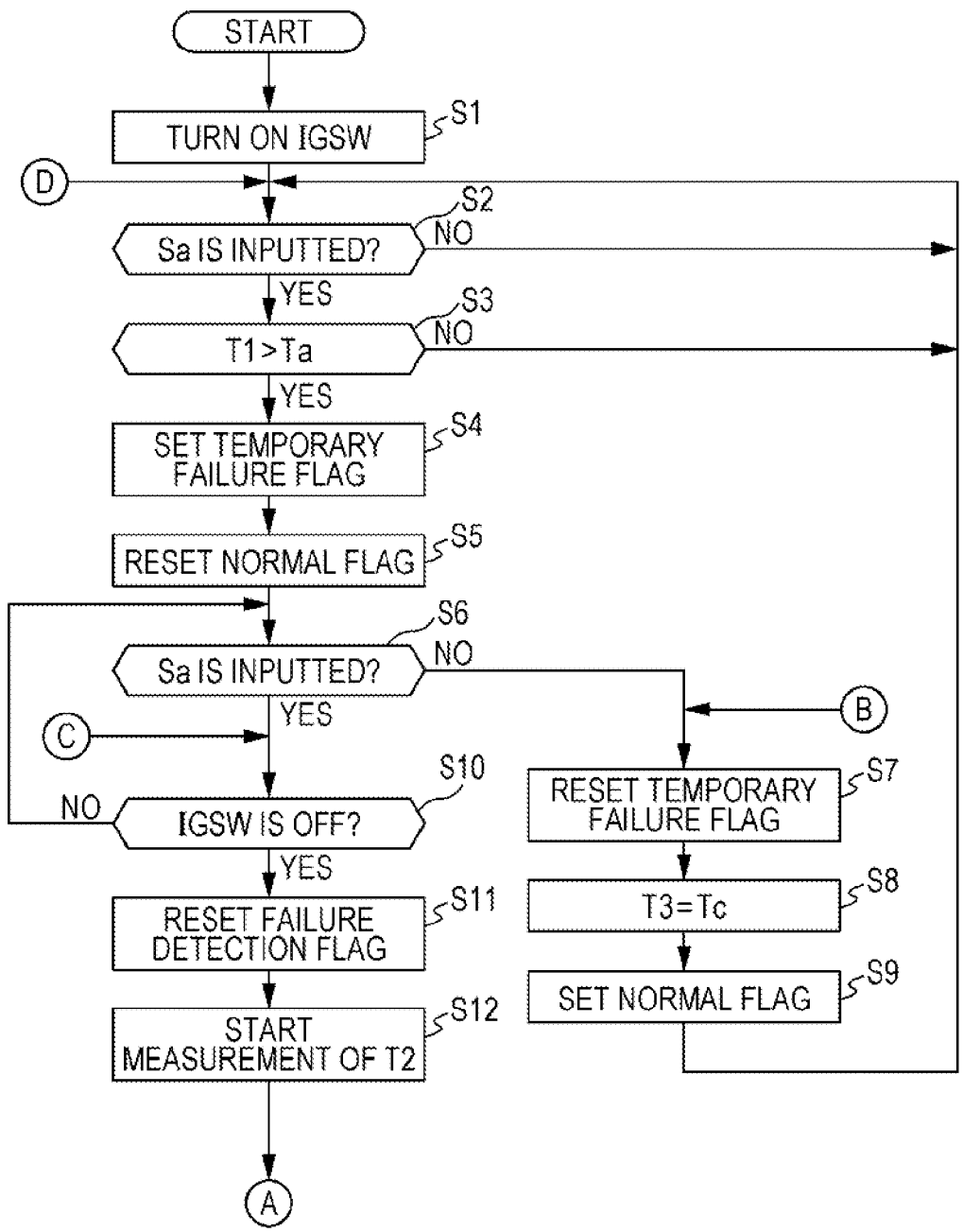
FIG. 3 is a first flowchart illustrating an exemplified control of failure detection of a fuel supply switch using the fuel tank system illustrated in FIG. 1.
Figure 4:
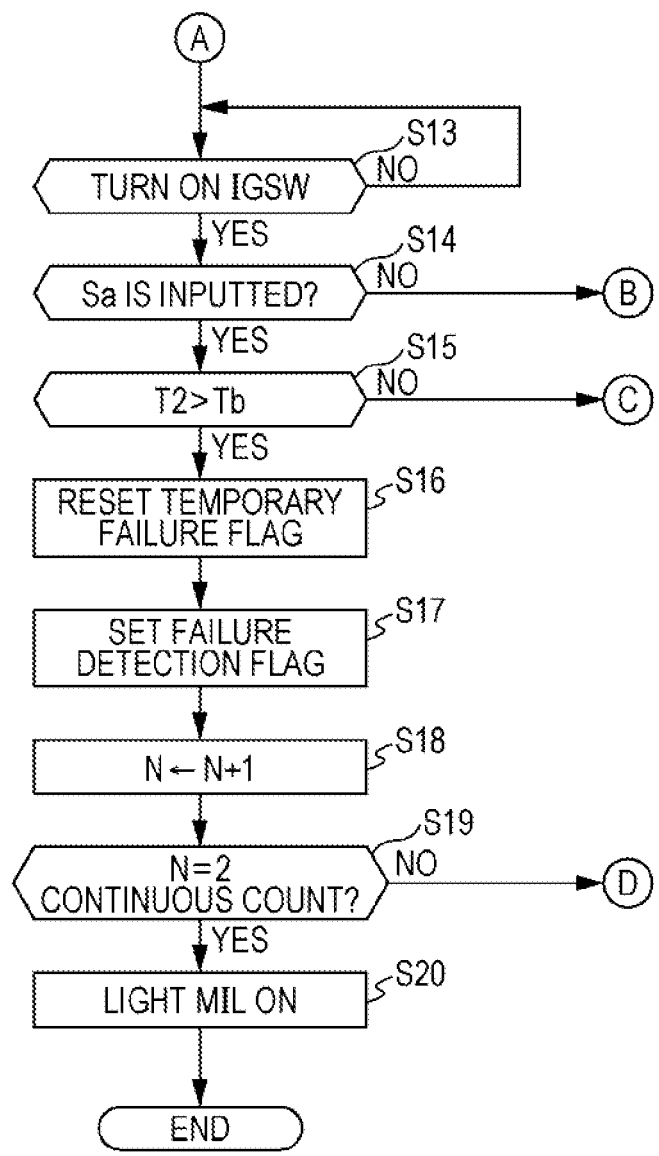
FIG. 4 is a second flowchart illustrating the exemplified control of failure detection of the fuel supply switch using the fuel tank system illustrated in FIG. 1.

Hereinafter, an example of failure detection control of the fuel supply SW 28 using the fuel tank system 10A according to the present embodiment will be described with reference to FIGS. 3 to 8. In the timing charts of FIGS. 5 to 8 (the first to fourth timing charts), the steps (such as S1) corresponding to those in the flowcharts (the first and second flowcharts) of FIGS. 3 and 4 are illustrated. In the following, description is primarily given with reference to the first timing chart of FIG. 5, and as necessary, with reference to the second to fourth timing charts of FIGS. 6 to 8.

Figure 5:
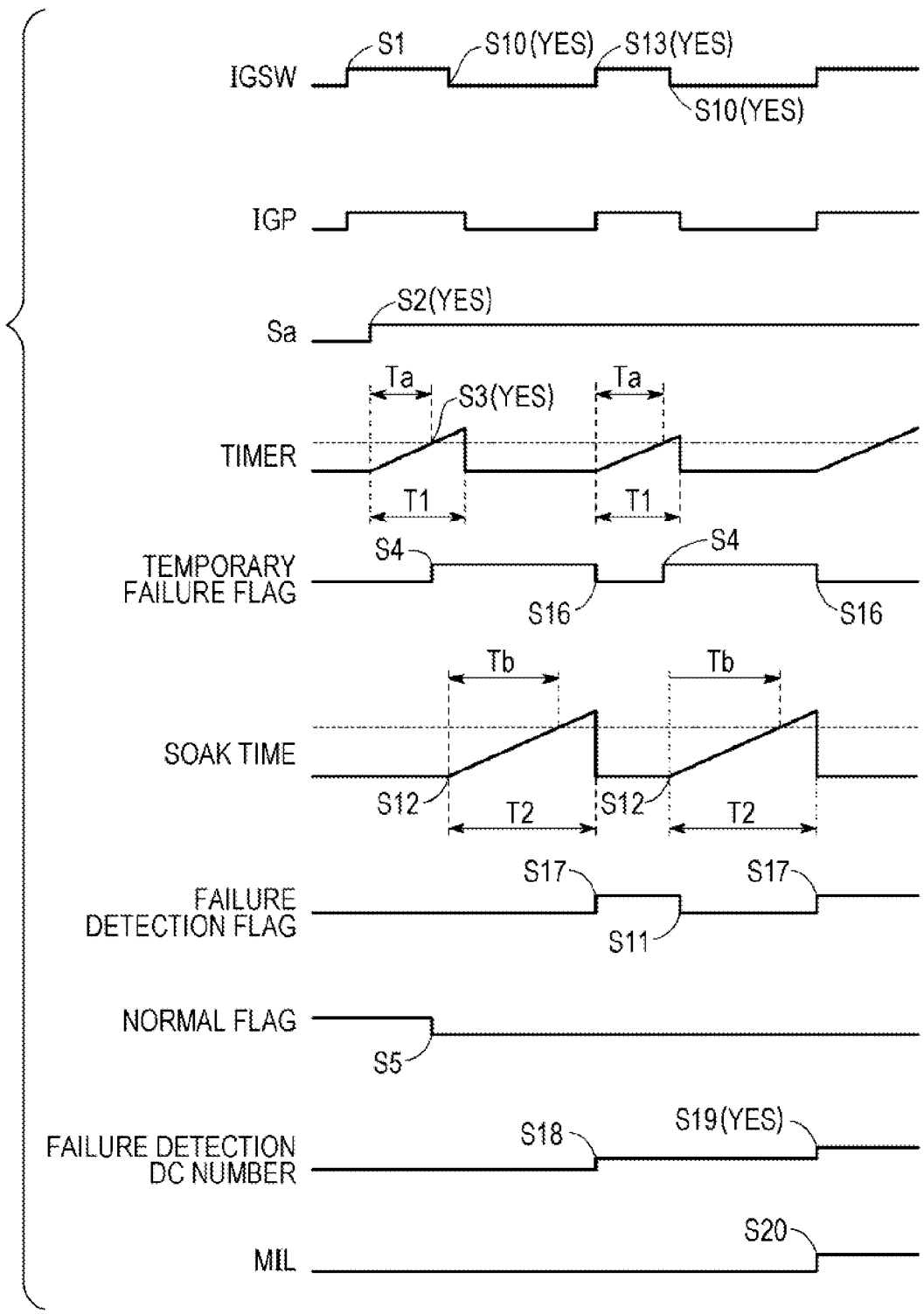
FIG. 5 is a first timing chart for explaining the failure detection control.
Figure 6:
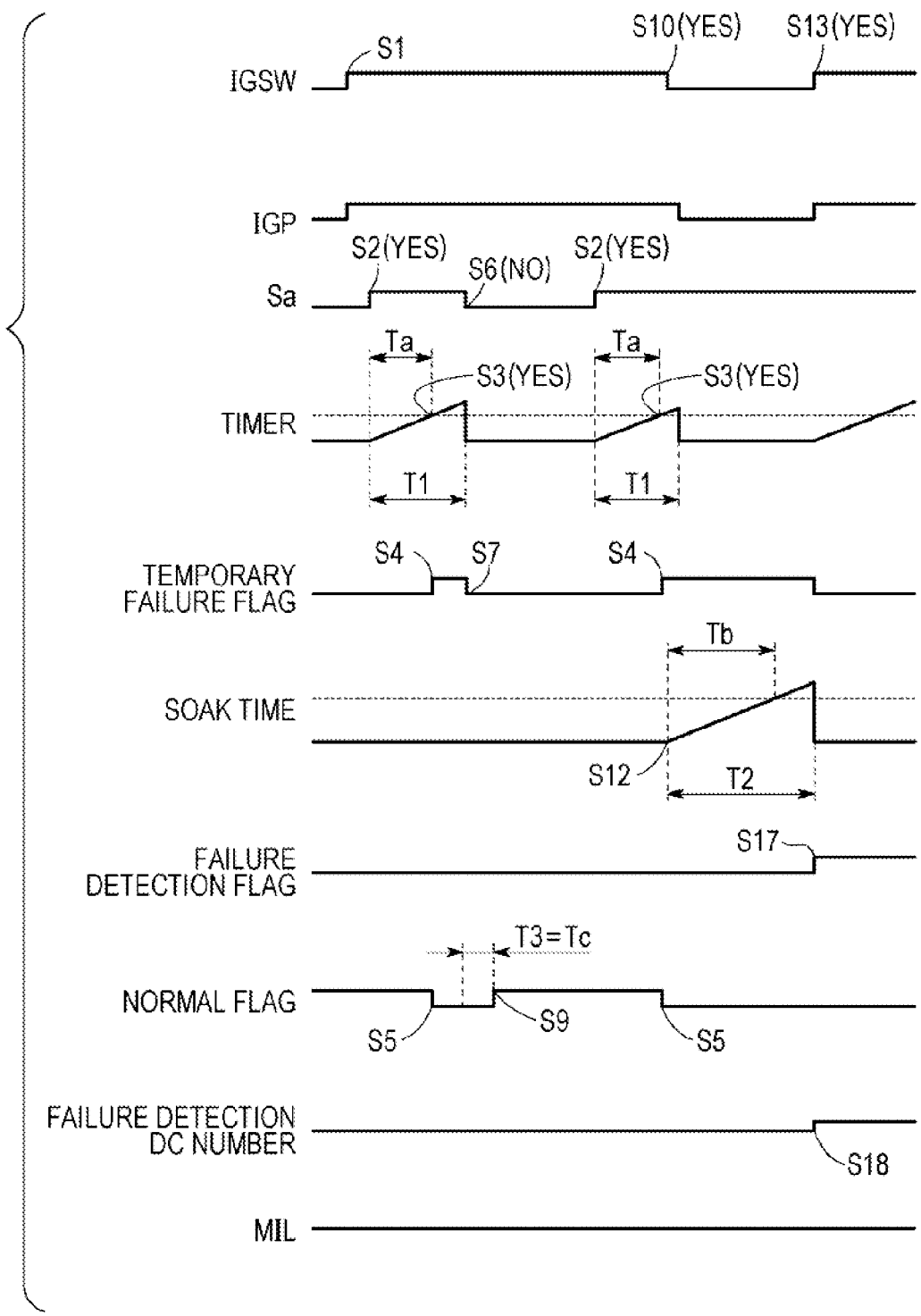
FIG. 6 is a second timing chart for explaining the failure detection control.
Figure 7:
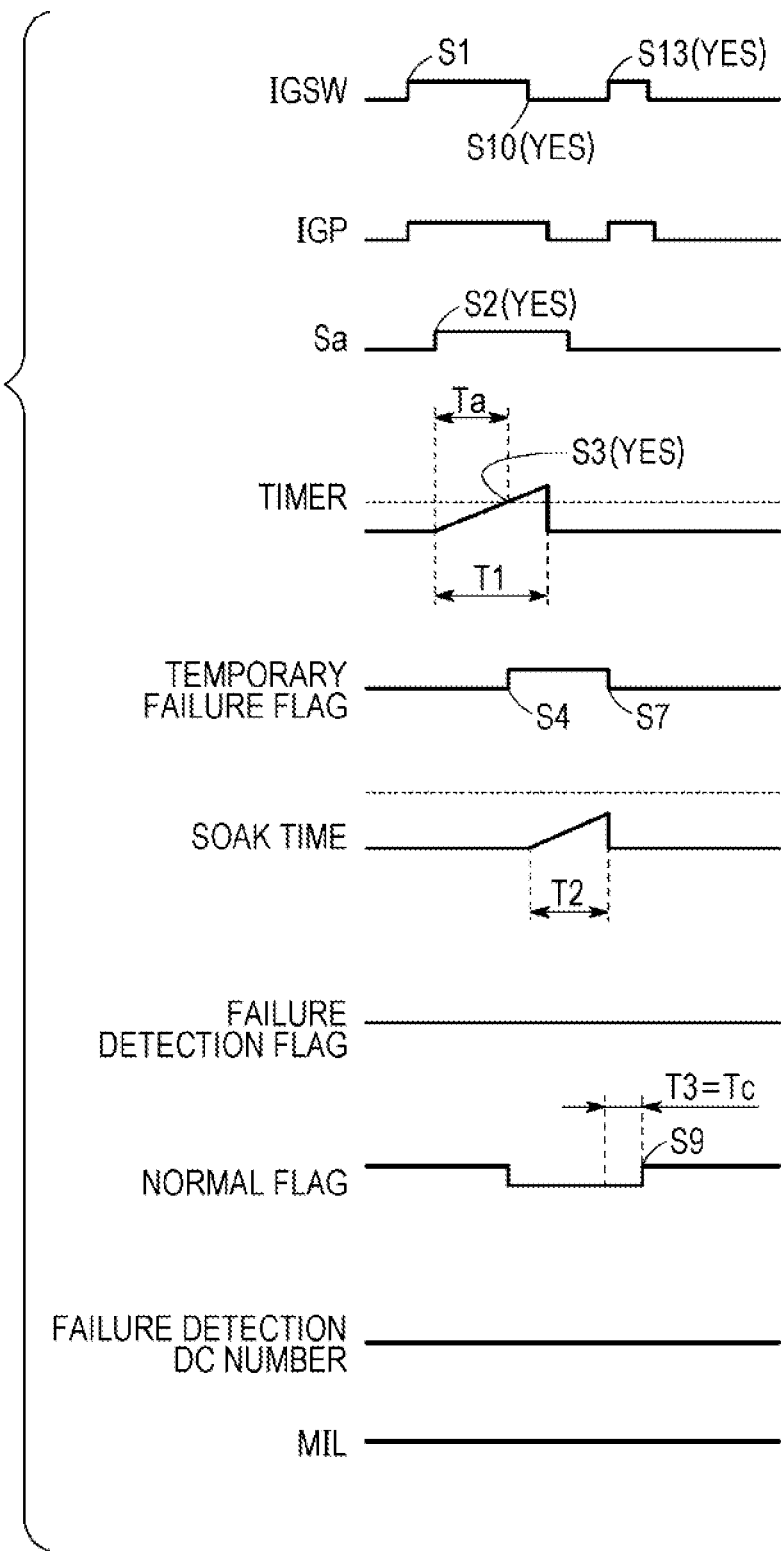
FIG. 7 is a third timing chart for explaining the failure detection control.
Figure 8:
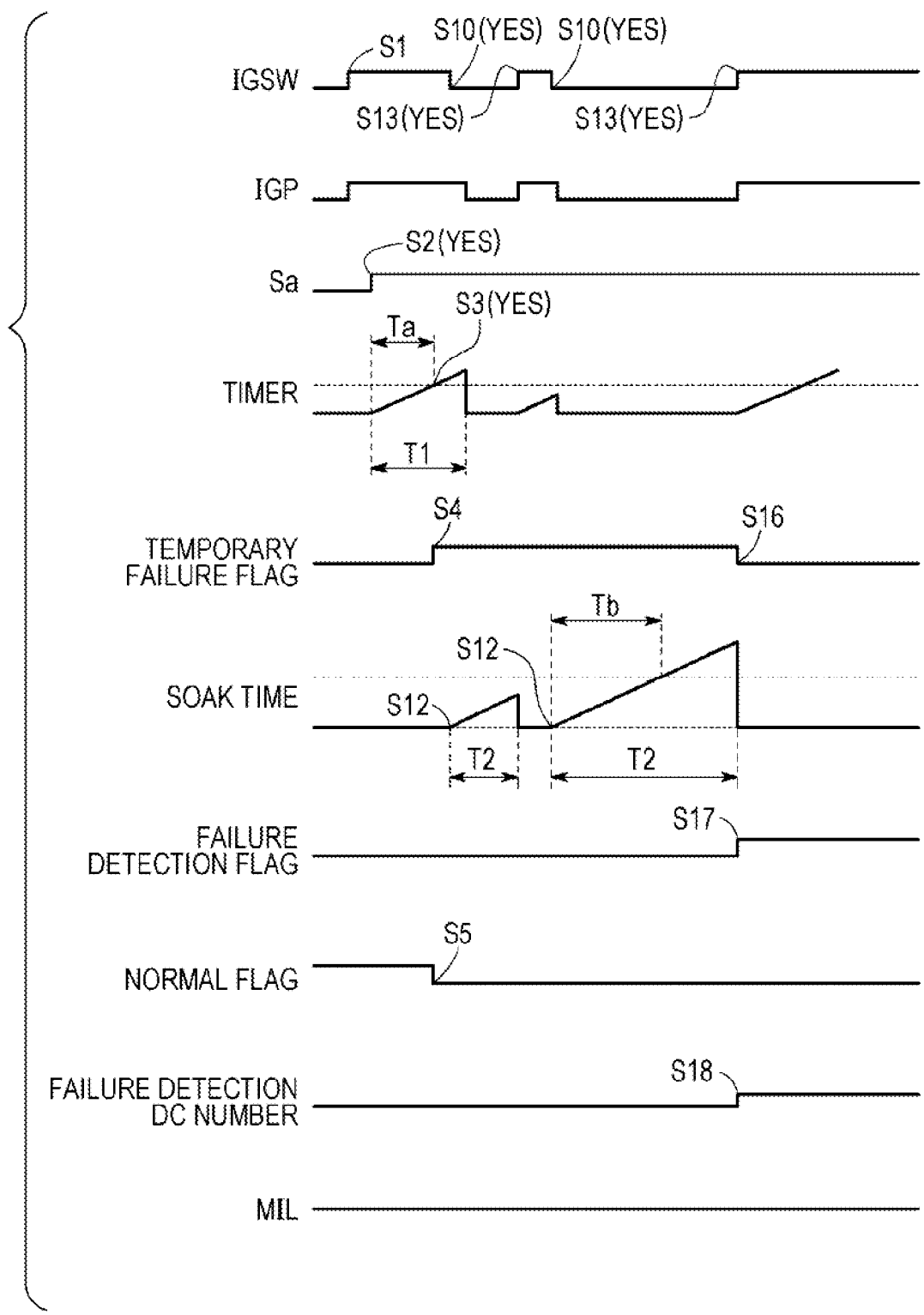
FIG. 8 is a fourth timing chart for explaining the failure detection control.

As illustrated in FIG. 5, first, a driver turns on the IGSW 12 in the present embodiment (step S1 of FIG. 3). Then, the main relay control circuit 76 turns on the main relay 72 so as to cause the electric power (IGP) of the battery 70 to be supplied to the first power supply circuit 74 via the main relay 72, and thus electric power having a constant voltage VCC_M is supplied from the first power supply circuit 74 to the main control unit 78.

Subsequently, the ECU 32 determines whether or not the open signal Sa has been inputted to the ECU 32 (step S2). When the open signal Sa has not been inputted to the ECU 32, the process in step S2 is repeatedly performed.

On the other hand, when the open signal Sa has been inputted to the ECU 32 (YES in step S2), the timer 86 measures the first input time T1 and stores it in the timer memory 88. The temporary failure determination unit 90 determines whether or not the first input time T1 stored in the timer memory 88 exceeds the temporary failure determination time Ta (step S3). When the first input time T1 does not exceed the temporary failure determination time Ta (NO in step S3), the flow returns to step S2.

On the other hand, when the first input time T1 exceeds the temporary failure determination time Ta (YES in step S3), the temporary failure flag setting unit 92 sets a temporary failure flag (step S4). When a normal flag has been set, the normal flag setting unit 102 resets the normal flag (step S5).

Subsequently, the ECU 32 determines whether or not the open signal Sa has been continuously inputted to the ECU 32 (step S6). When the open signal Sa has not been inputted (NO in step S6), the temporary failure flag setting unit 92 resets the temporary failure flag (see step S7 and FIG. 6).

When a time T3 that is a time elapsed since the input of the open signal Sa was stopped reaches a predetermined return determination time Tc (step S8), the normal flag setting unit 102 sets a normal flag (step S9). Subsequently, the flow returns to step S2.

In this manner, when the open signal Sa is no longer inputted, the temporary failure flag is reset and the normal flag is set, and thus an erroneous detection of abnormality of the fuel supply SW 28 can be preferably prevented in such a case that fixed ON state abnormality of the fuel supply SW 28 is detected due to pressing of the fuel supply SW 28 for a long time, or that fixed ON state abnormality of the fuel supply SW 28 is recovered.

As illustrated in FIG. 5, when the open signal Sa has been continuously inputted (YES in step S6), the ECU 32 determines whether or not the IGSW 12 is turned off (step S10). When the IGSW 12 remains in ON state (NO in step S10), the flow returns to step S6.

When the IGSW 12 is turned off (YES in step S10) and the failure detection flag has been set, the failure detection flag setting unit 100 resets the failure flag (step S11). In the example of FIG. 5, when the failure detection DC number N is one, the process in step S11 is performed.

At this moment, the SOAK time measurement circuit 94 starts to measure a SOAK time T2 (step S12). When a predetermined time has elapsed after the IGSW 12 is turned off, the main relay control circuit 76 turns off the main relay 72 so as to interrupt the supply of the electric power (IGP) from the battery 70 to the first power supply circuit 74.

Subsequently, the ECU 32 determines whether or not the IGSW 12 has been turned on (step S13 of FIG. 4). When the IGSW 12 is off, the process in step S13 is repeatedly performed. On the other hand, when the IGSW 12 is turned on (YES in step S13), the main relay control circuit 76 turns on the main relay 72 based on an output signal from the IGSW 12. Accordingly, the electric power (IGP) is supplied from the battery 70 to the first power supply circuit 74, and thus the main control unit 78 is driven. The SOAK time receiving unit 96 receives the SOAK time T2 which has been measured by the SOAK time measurement circuit 94, by serial communication.

Subsequently, the ECU 32 determines whether or not the open signal Sa is inputted to the ECU 32 (step S14). When the open signal Sa is not inputted (NO in step S14), the above-described process in and after step S7 is performed (see FIG. 7). In this case, an erroneous detection of abnormality of the fuel supply SW 28 can be preferably prevented, too.

When the open signal Sa is inputted (YES in step S14), the failure determination unit 98 determines whether or not the SOAK time T2 exceeds a failure determination time Tb (step S15). When the SOAK time T2 does not exceed the failure determination time Tb (NO in step S15), the temporary failure flag setting unit 92 performs the process of step S10 and subsequent steps without resetting the temporary failure flag (see FIG. 8).

That is to say, there may be a case where measurement of the SOAK time T2 is interrupted due to turning on of the IGSW 12 before the SOAK time T2 reaches the failure determination time Tb, and thus the process of step S10 and subsequent steps is performed again by suspending the failure determination of the last time.

As illustrated in FIG. 5, when the SOAK time T2 exceeds the failure determination time Tb (YES in step S15), the temporary failure flag setting unit 92 resets the temporary failure flag (step S16), and the failure detection flag setting unit 100 sets the failure flag (step S17).

The failure detection DC number counter 104 increments the failure detection DC number N by one (step S18). Subsequently, the notification determination unit 106 determines whether or not the failure detection DC number N has been counted twice successively (step S19). When the failure detection DC number N has not been counted twice successively (NO in step S19), the process of step S2 and subsequent steps is performed.

When the failure detection DC number N has been counted twice successively (YES in step S19), the MIL control unit 108 lights on the MIL 30, thereby informing a driver of a failure of the fuel supply SW 28 (step S20). In this step, the flowchart is terminated.

According to the present embodiment, even in the case where the IGSW 12 is turned off, the failure determination unit 98 determines that the fuel supply SW 28 has an abnormality when the SOAK time T2, which is measured by the SOAK time measurement circuit 94, is longer than the failure determination time Tb. Consequently, fixed ON state abnormality of the fuel supply SW 28 can be detected (determined) at an early stage.

Second Embodiment

Next, a fuel tank system 10B according to a second embodiment of the present disclosure will be described with reference to FIGS. 9 to 13. In the present embodiment, the elements having the same or similar functions and effects as or to those of the above-described first embodiment are labeled with the same reference symbols, and detailed description is omitted. In a similar manner, detailed description will be omitted in the third embodiment described below.

Figure 9:
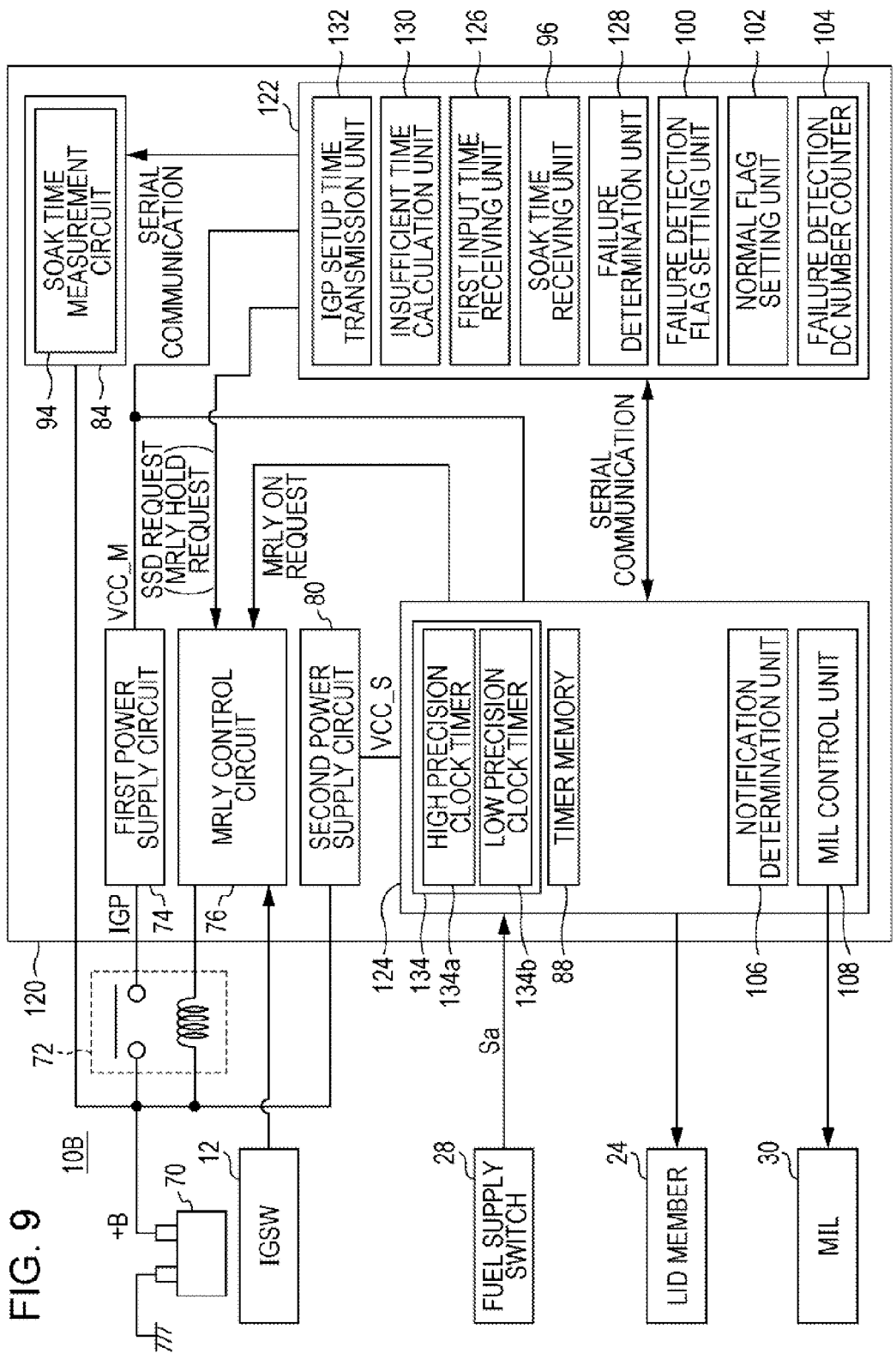
FIG. 9 is a block diagram of an ECU included in a fuel tank system according to a second embodiment of the present disclosure.

As illustrated in FIG. 9, an ECU 120 included in the fuel tank system 10B according to the present embodiment includes a main control unit 122 and a sub control unit 124. The main control unit 122 has the SOAK time receiving unit 96, the failure detection flag setting unit 100, the normal flag setting unit 102, the failure detection DC number counter 104, a first input time receiving unit 126, a failure determination unit (abnormality determination unit) 128, an insufficient time calculation unit 130, and an IGP setup time transmission unit 132.

The first input time receiving unit 126 receives the first input time T1 stored in the timer memory 88, by serial communication. The failure determination unit 128 determines whether or not the first input time T1 exceeds a predetermined failure determination time (second determination time) Td.

The insufficient time calculation unit 130 calculates an insufficient time for the first input time T1 with respect to the failure determination time Td when the IGSW 12 is turned off. Specifically, the insufficient time calculation unit 130 calculates an insufficient time, for example, by subtracting the first input time T1 from the failure determination time Td, the first input time T1 being measured when the IGSW 12 is turned off.

The IGP setup time transmission unit 132 sets an extension time Tx to be extended after turning off of the IGSW 12 until the main relay 72 is turned off, and transmits the extension time Tx as an SSD request (MRLY hold request) to the main relay control circuit 76. In the present embodiment, the extension time Tx corresponds to the insufficient time calculated by the insufficient time calculation unit 130.

The sub control unit 124 has a timer 134, the timer memory 88, the notification determination unit 106, and the MIL control unit 108. The timer 134 has a high speed clock timer 134a and a low speed clock timer 134b, and primarily has the same configuration as that of the above-described timer 86. The timer 134 also serves as an off-timer which measures a time (OFF time) T4 during which the open signal Sa is not inputted while the IGSW 12 is on.

Figure 10:
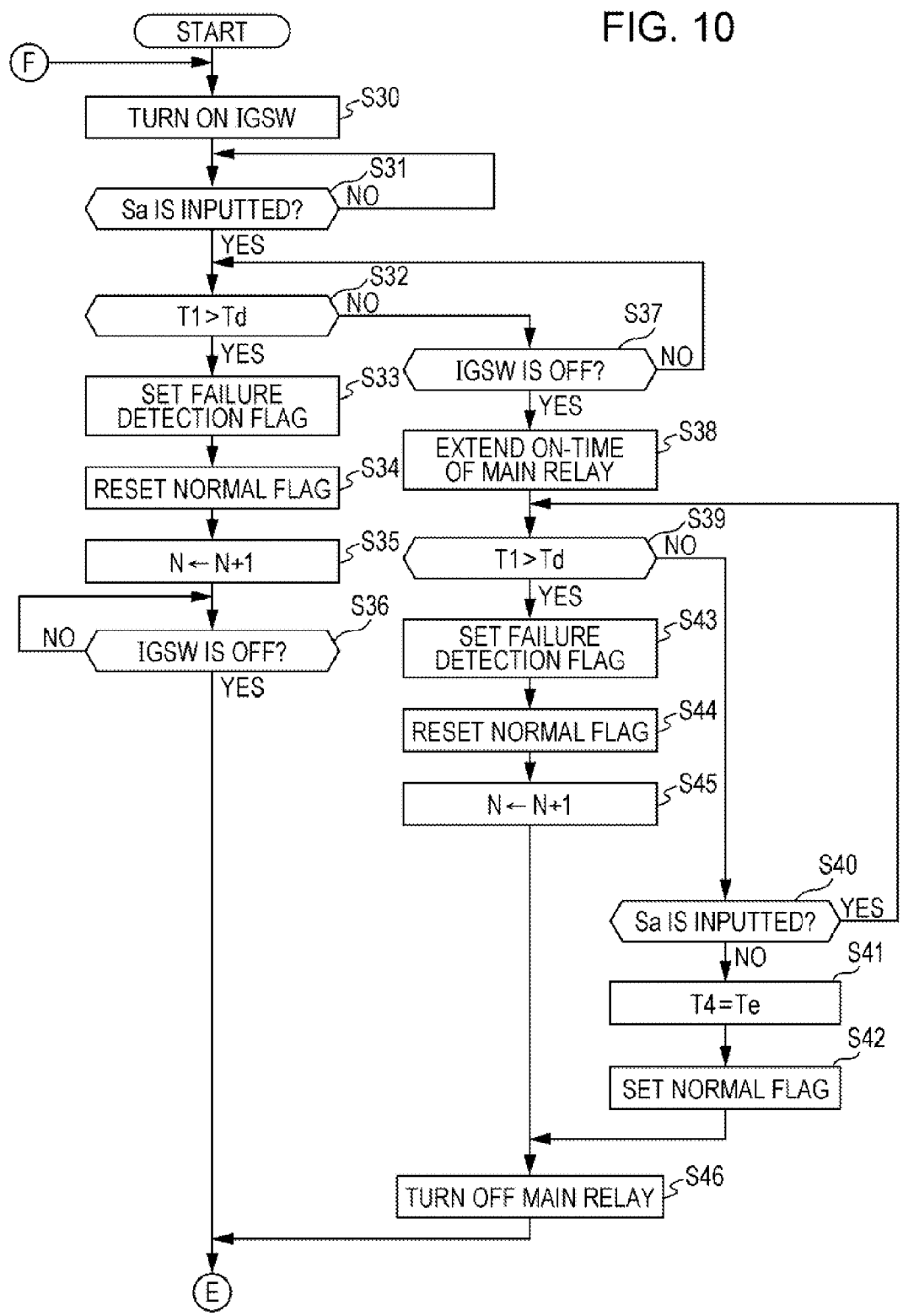
FIG. 10 is a first flowchart illustrating an exemplified control of failure detection of a fuel supply switch using the fuel tank system illustrated in FIG. 9.
Figure 11:
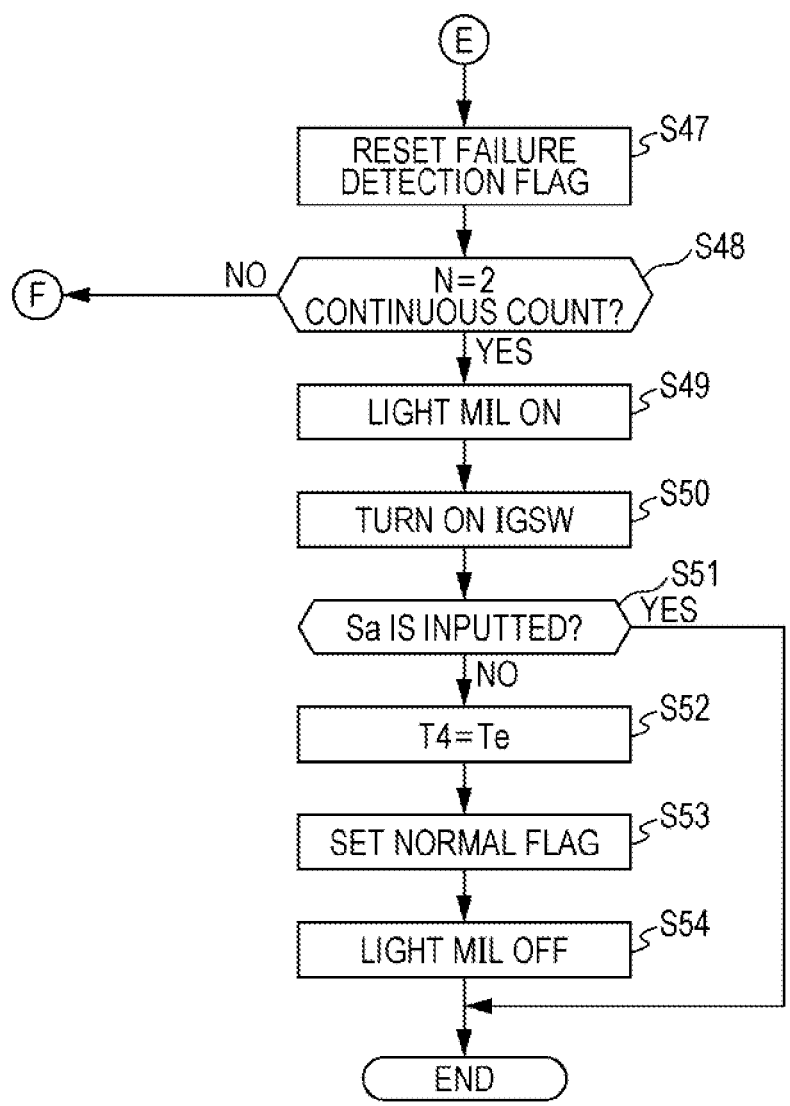
FIG. 11 is a second flowchart illustrating the exemplified control of failure detection of the fuel supply switch using the fuel tank system illustrated in FIG. 9.

Hereinafter, an example of failure detection control of the fuel supply SW 28 using the fuel tank system 10B according to the present embodiment will be described with reference to FIGS. 10 to 13. In the timing charts of FIGS. 12 and 13 (the first and second timing charts), the steps (such as S30) corresponding to those in the flowcharts (the first and second flowcharts) of FIGS. 10 and 11 are illustrated. In the following, description is primarily given with reference to the timing chart of FIG. 12, and as necessary, with reference to the timing chart of FIG. 13.

Figure 12:
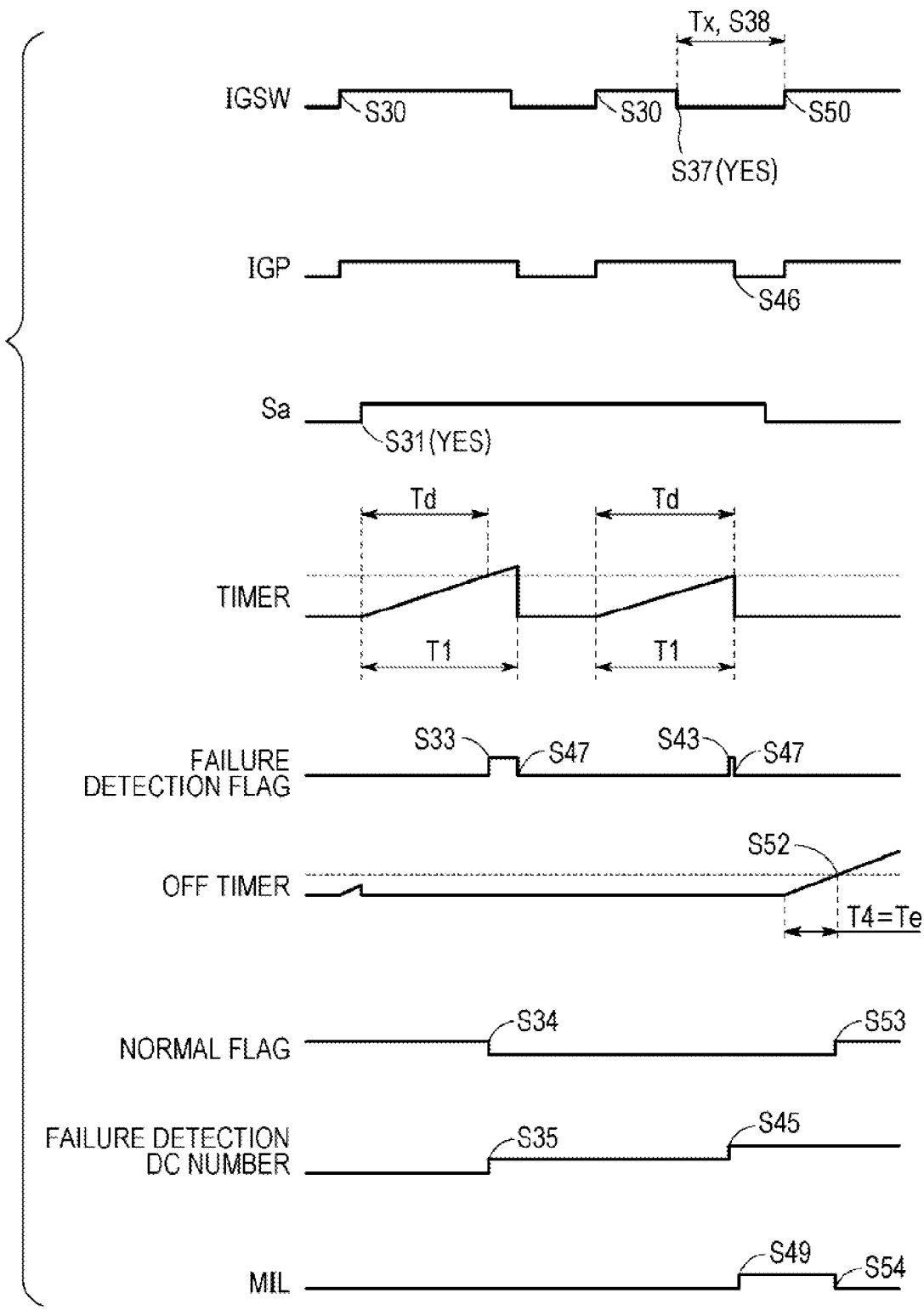
FIG. 12 is a first timing chart for explaining failure detection control according to a second embodiment.
Figure 13:
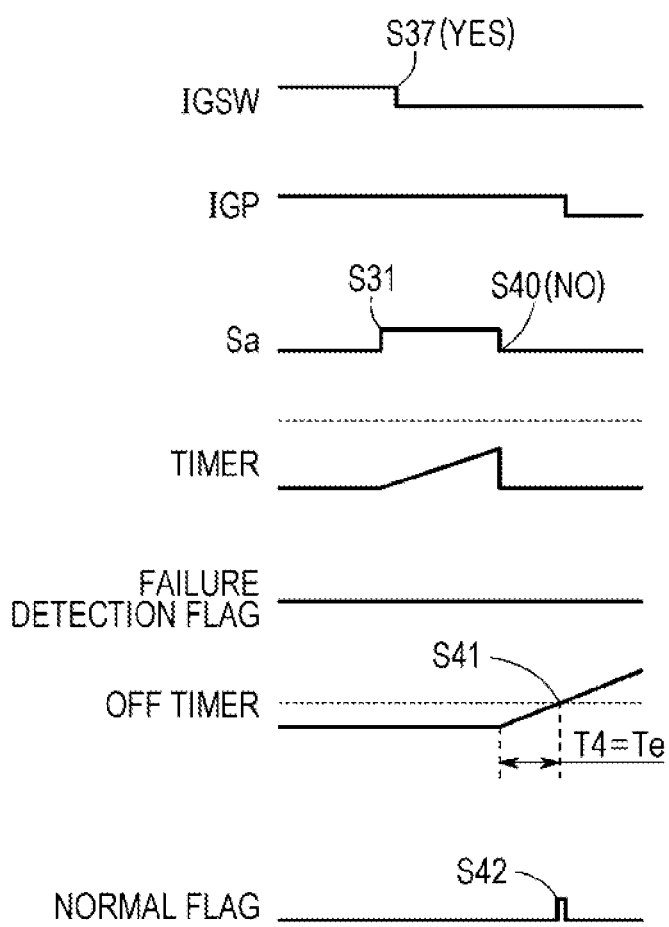
FIG. 13 is a second timing chart for explaining the failure detection control according to the second embodiment.

As illustrated in FIG. 12, first, a driver turns on the IGSW 12 in the present embodiment (step S30 in FIG. 10). Then, the electric power (IGP) of the battery 70 is supplied to the first power supply circuit 74 via the main relay 72, and thus electric power having a constant voltage VCC_M is supplied from the first power supply circuit 74 to the main control unit 122.

Subsequently, the ECU 120 determines whether or not the open signal Sa has been inputted to the ECU 120 (step S31). When the open signal Sa has not been inputted to the ECU 120, the process in step S31 is repeatedly performed.

On the other hand, when the open signal Sa has been inputted to the ECU 120 (YES in step S31), the timer 134 measures the first input time T1 and stores it in the timer memory 88. The first input time receiving unit 126 receives the first input time T1 stored in the timer 134 by serial communication.

The failure determination unit 128 then determines whether or not the first input time T1 received by the first input time receiving unit 126 exceeds the failure determination time T (step S32). When the first input time T1 exceeds the failure determination time Td (YES in step S32), the failure detection flag setting unit 100 sets a failure detection flag (step S33). At this time, when the normal flag has been set, the normal flag setting unit 102 resets the normal flag (step S34).

Subsequently, the failure detection DC number counter 104 increments the failure detection DC number N by one (step S35). Subsequently, the ECU 120 determines whether or not the IGSW 12 is turned off (step S36). When the IGSW 12 remains in ON state (NO in step S36), the process in step S36 is performed again, and when the IGSW 12 is turned off, the flow proceeds to step S47.

On the other hand, when the first input time T1 does not exceed the failure determination time Td in step S32, the ECU 120 determines whether or not the IGSW 12 is turned off (step S37). When the IGSW 12 remains in ON state (NO in step S37), the process of step S32 and subsequent steps is performed.

When the IGSW 12 is turned off (YES in step S37), the insufficient time calculation unit 130 calculates an insufficient time for the first input time T1 with respect to the failure determination time Td, the first input time T1 being received by the first input time receiving unit 126. The IGP setup time transmission unit 132 sets an extension time Tx corresponding to the insufficient time, and transmits the extension time Tx as an SSD request (MRLY hold request) to the main relay control circuit 76. The main relay control circuit 76 then extends ON-time of the main relay 72 by the extension time Tx according to the SSD request (step S38).

Accordingly, the main relay 72 is turned off at the time when the extension time Tx has elapsed since the IGSW 12 is turned off. That is to say, even when the IGSW 12 is in OFF state, measurement of the first input time T1 can be continued so as to perform failure determination because the main control unit 122 is driven.

Next, the failure determination unit 128 determines whether or not the first input time T1 exceeds the failure determination time Td (step S39). When the first input time T1 does not exceed the failure determination time Td (NO in step S39), the ECU 120 determines whether or not the open signal Sa is inputted to the ECU 120 (step S40). When the open signal Sa is inputted to the ECU 120, the process of step S39 and subsequent steps is performed.

When the open signal Sa is not inputted to the ECU 120 (NO in step S40), the timer (off-timer) 134 measures an elapsed time T4 since the input of the open signal Sa was stopped. When the elapsed time T4 reaches a predetermined return determination time Te (step S41), the normal flag setting unit 102 sets the normal flag (see step S42 and FIG. 13). Subsequently, the flow proceeds to step S46.

As illustrated in FIG. 12, when the first input time T1 exceeds the failure determination time Td (YES in step S39), the failure detection flag setting unit 100 sets the failure detection flag (step S43). When the normal flag has been set, the normal flag setting unit 102 resets the normal flag (step S44). In the example of FIG. 12, the above procedure is not performed because the normal flag has been already set. Subsequently, the failure detection DC number counter 104 increments the failure detection DC number N by one (step S45).

The main relay control circuit 76 then turns off the main relay 72 when the extension time Tx has elapsed (step S46). Consequently, supply of the electric power IGP from the battery 70 to the first power supply circuit 74 is interrupted, and supply of the electric power to the main control part 122 is also interrupted.

Subsequently, the failure detection flag setting unit 100 resets the failure detection flag in step S47 of FIG. 11. The notification determination unit 106 determines whether or not the failure detection DC number N has been counted twice successively (step S48). When the failure detection DC number N has not been counted twice successively, the process in and after step S30 is performed.

On the other hand, when the failure detection DC number N has been counted twice successively (YES in step S48), the MIL control unit 108 lights on the MIL 30, thereby informing a driver of a failure of the fuel supply SW 28 (step S49).

Subsequently, when the IGSW 12 is turned on (step S50), the ECU 120 determines whether or not the open signal Sa is inputted to the ECU 120 (step S51). When the open signal Sa is inputted, the flowchart is terminated.

On the other hand, when the open signal Sa is not inputted to the ECU 120 (NO in step S51), the timer (off-timer) 134 measures an elapsed time T4 since the input of the open signal Sa was stopped. When the elapsed time T4 reaches the predetermined return determination time Te (step S52), the normal flag setting unit 102 sets the normal flag (step S53) and the MIL control unit 108 lights off the MIL 30 (step S54). In this step, the flowchart is terminated.

According to the present embodiment, when the IGSW 12 is turned off with the first input time T1 measured by the timer 134 less than the failure determination time Td, the main relay 72 is turned off when the first input time T1 exceeds the failure determination time Td, and thus even when the IGSW 12 is turned off, interruption of power supply to the main control unit 122 can be preferably prevented in the middle of measuring the first input time T1 by the timer 134. Consequently, even when the main control unit 122 is provided with the failure determination unit 128 or the like, failure (abnormality) of the fuel supply SW 28 can be detected at an early stage.

In addition, the main relay control circuit 76 can reduce the driving time of the main control unit 122 while the IGSW 12 is off as much as possible because the extension time Tx to be extended after turning off of the IGSW 12 until the main relay 72 is turned off is set to the time corresponding to the insufficient time calculated by the insufficient time calculation unit 130. Consequently, electric power consumption of the battery 70 can be preferably reduced.

Furthermore, when the open signal Sa is not inputted at the time of turning on of the IGSW 12 after the fuel supply SW 28 is determined to have failure, the main control unit 122 determines that the fuel supply SW 28 is normal, and thus an erroneous determination of failure (abnormality) of the fuel supply SW 28 can be prevented. The main control unit 122 determining the failure does not need power supply while the IGSW 12 is off, and thus power consumption can be reduced.

The present embodiment is not limited to the above-described embodiment. As illustrated in FIG. 9, the sub control unit 124 may be configured to make a main relay ON request (MRLY ON request) to the main relay control circuit 76. That is to say, in this case, even when the IGSW 12 is off, the main relay control circuit 76 turns on the main relay 72 based on the main relay ON request transmitted from the sub control unit 124, and thus the electric power IGP is supplied to the first power supply circuit 74 so as to be able to drive the main control unit 122.

Figure 14:
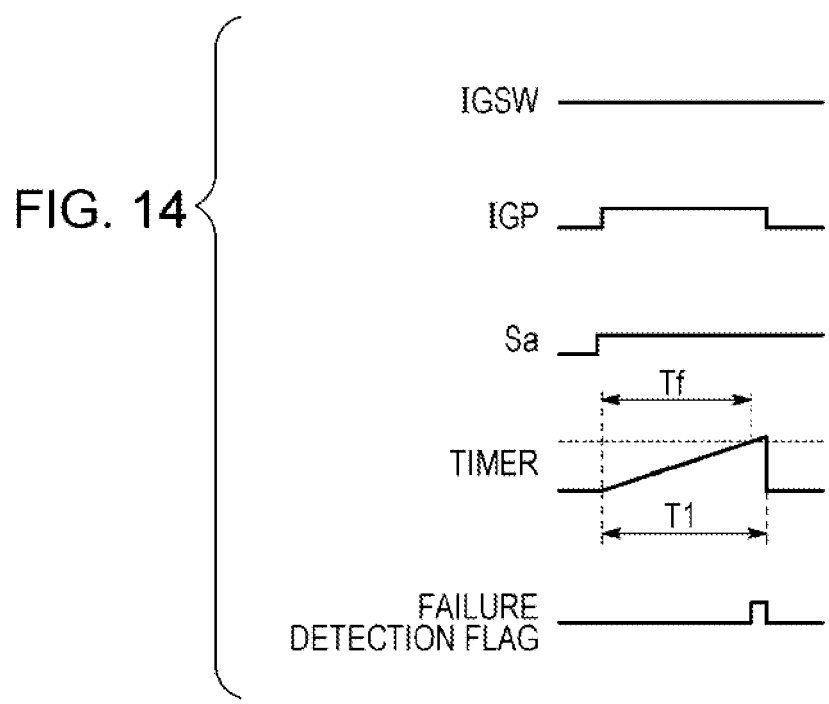
FIG. 14 is a timing chart for explaining failure detection control according to a modification of the second embodiment.

In the present modification, when the open signal Sa is inputted while the IGSW 12 is off as illustrated in FIG. 14, the sub control unit 124 outputs a main relay ON request to the main relay control circuit 76, and thus the main relay control circuit 76 turns on the main relay 72. Accordingly, the electric power IGP of the battery 70 is supplied to the main control unit 122, and thus the first input time receiving unit 126 can receive the first input time T1 stored in the timer memory 88, by serial communication.

The failure determination unit 128 then determines whether or not the first input time T1 received by the first input time receiving unit 126 exceeds the failure determination time Tf, and when the first input time T1 exceeds the failure determination time Tf, the failure detection flag setting unit 100 sets the failure detection flag.

Subsequently, the sub control unit 124 outputs a main relay OFF request to the main relay control circuit 76, thereby intercepting the supply of the electric power IGP from the battery 70. At this point, the failure detection flag setting unit 100 resets the failure detection flag.

According to the above-described modification, even when the IGSW 12 is off, the driving time of the main control unit 122 can be reduced as much as possible, and thus electric power consumption of the battery 70 can be reduced.

Third Embodiment

Hereinafter, a fuel tank system 10C according to a third embodiment of the present disclosure will be described with reference to FIGS. 15 to 17.

Figure 15:
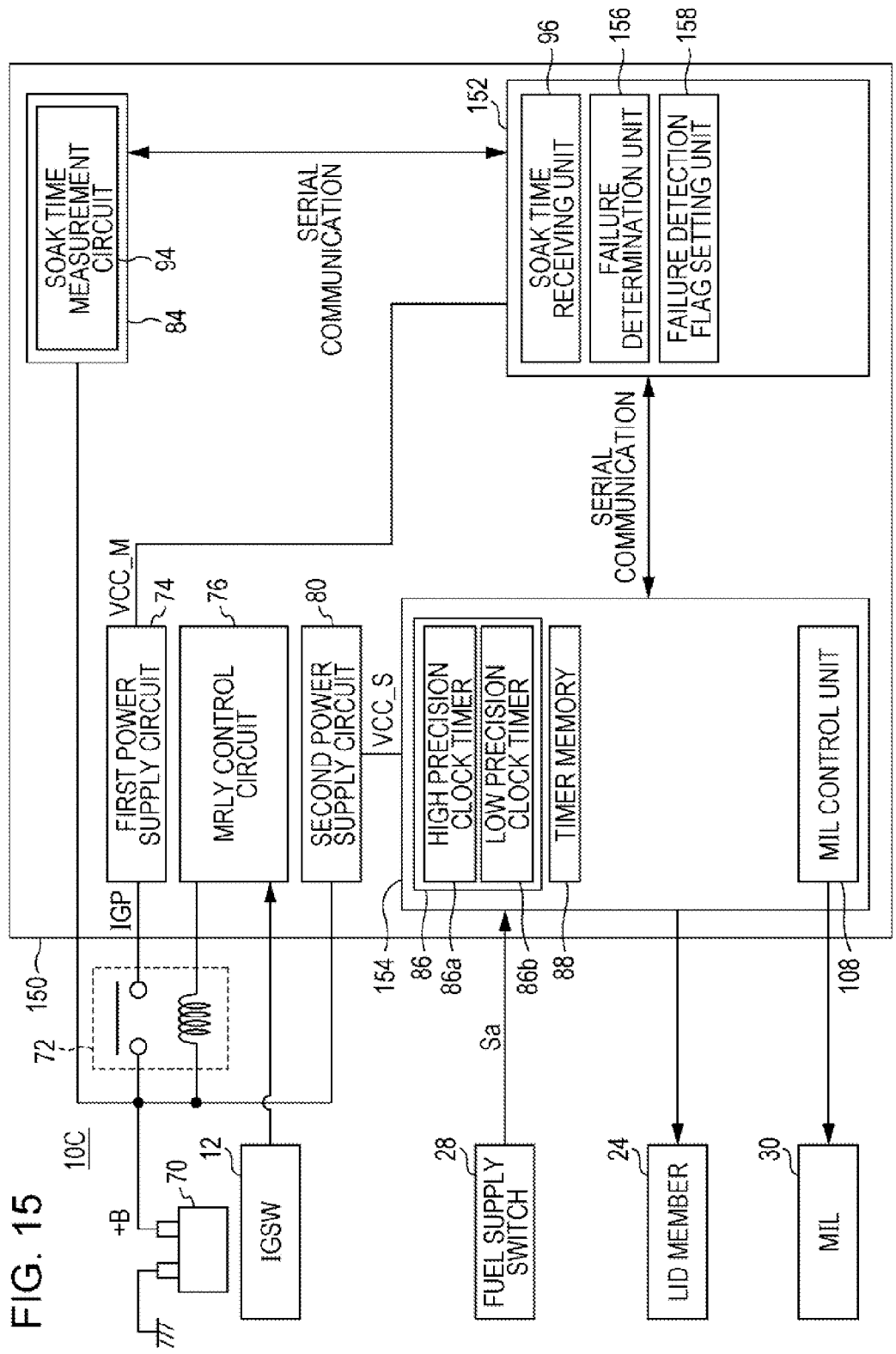
FIG. 15 is a block diagram of an ECU included in a fuel tank system according to a third embodiment of the present disclosure.

As illustrated in FIG. 15, the ECU 150 in the fuel tank system 10C according to the present embodiment includes a main control unit 152 and a sub control unit 154. The main control unit 152 has the SOAK time receiving unit 96, a failure determination unit 156, and a failure detection flag setting unit 158.

The failure determination unit 156 determines whether or not a total time (total measured times) T0 of the first input time T1 and SOAK time T2 exceeds a predetermined failure determination time (third determination time) Tf, the first input time T1 being transmitted from the timer memory 88 to the main control unit 152, the SOAK time T2 being received by the SOAK time receiving unit 96. The failure detection flag setting unit 158 sets the failure detection flag based on a result determined by the failure determination unit 156. The sub control unit 154 has the timer 86, the timer memory 88, and the MIL control unit 108.

Hereinafter, failure detection control of the fuel supply SW 28 using the fuel tank system 10C according to the present embodiment will be described with reference to FIGS. 16 and 17. In the timing chart of FIG. 17, the steps (such as S60) corresponding to those in the flowchart of FIG. 16 are illustrated.

Figure 16:
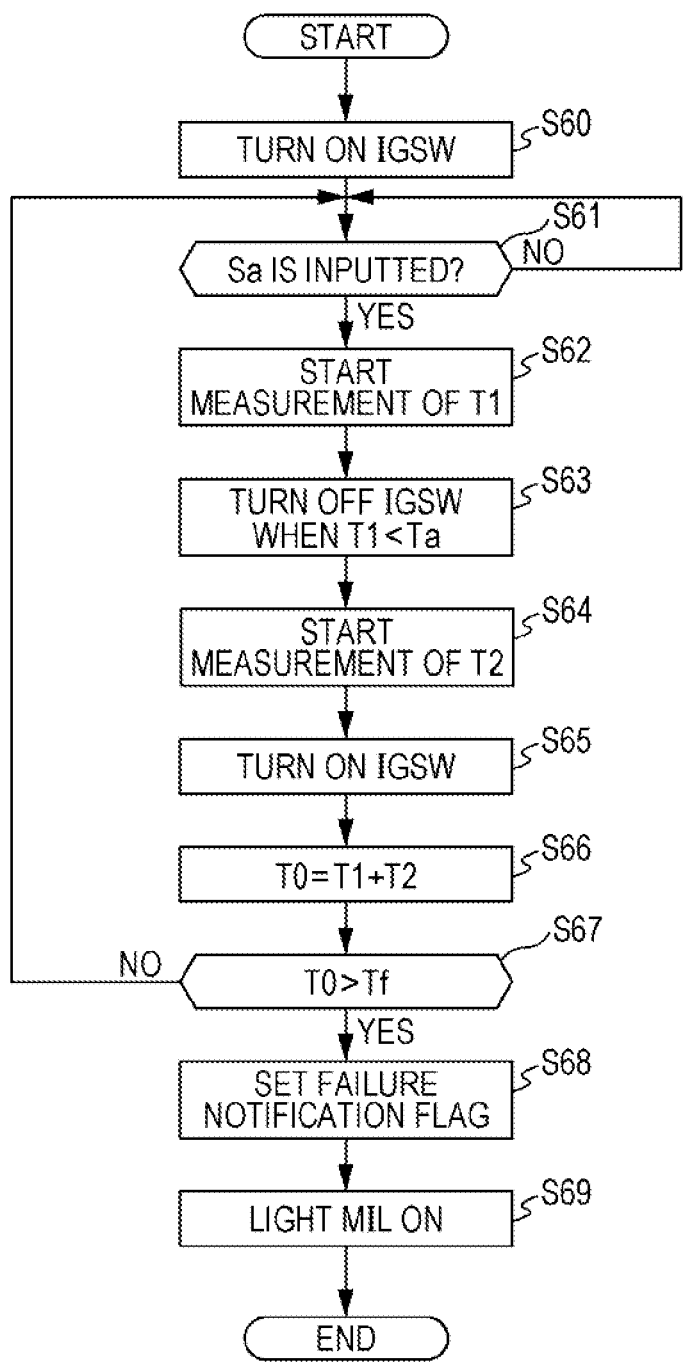
FIG. 16 is a flowchart for explaining an example of failure detection control according to the third embodiment.

As illustrated in FIG. 17, first, a driver turns on the IGSW 12 in the present embodiment (step S60 in FIG. 16). Then, the electric power IGP of the battery 70 is supplied to the first power supply circuit 74 via the main relay 72, and thus electric power having a constant voltage VCC_M is supplied from the first power supply circuit 74 to the main control unit 122.

Subsequently, the ECU 150 determines whether or not the open signal Sa is inputted to the ECU 150 (step S61). When the open signal Sa is not inputted to the ECU 150, the process in step S61 is repeatedly performed.

On the other hand, when the open signal Sa is inputted to the ECU 150 (YES in step S61), the timer 86 measures the first input time T1 and stores it in the timer memory 88 (step S62). The first input time T1 stored in the timer memory 88 is transmitted to the main control unit 152 by serial communication.

Subsequently, when the IGSW 12 is turned off with the first input time T1 measured by the timer 86 less than the temporary failure determination time Ta (step S63), the SOAK time measurement circuit 94 starts to measure a SOAK time T2 (step S64). At this point, the timer 86 stops measurement of the first input time T1. When a predetermined time has elapsed after the IGSW 12 is turned off, the main relay control circuit 76 turns off the main relay 72 so as to interrupt the supply of the electric power (IGP) from the battery 70 to the first power supply circuit 74.

Subsequently, when the IGSW 12 is turned on (step S65), the main relay control circuit 76 turns on the main relay 72 according to the output signal from the IGSW 12. Consequently, the main control unit 152 is driven. The main control unit 152 calculates the total time T0 of the first input time T1 and the SOAK time T2 (step S66).

Subsequently, the failure determination unit 156 determines whether or not the total time T0 exceeds the failure determination time Tf (step S67). When the total time T0 does not exceed the failure determination time Tf (NO in step S67), the flow returns to step S61.

On the other hand, when the total time T0 exceeds the failure determination time Tf (YES in step S67), the failure detection flag setting unit 158 sets the failure detection flag (step S68), and the MIL control unit 108 lights on the MIL 30 (step S69). In this step, the flowchart in the present embodiment is terminated.

According to the present embodiment, when the IGSW 12 is turned off with the first input time T1 measured by the timer 86 less than the temporary failure determination time Ta, the failure determination unit 98 determines that the fuel supply SW 28 has failure when the total time T0 of the first input time T1 and the SOAK time T2 immediately after the turn off of the IGSW is longer than the failure determination time Tf, and thus failure (abnormality) of the fuel supply SW 28 can be efficiently detected at an early stage.

The present disclosure is not limited to the above-described embodiments, and may have various configurations without departing from the spirit of the present disclosure.

For example, in the above-described fuel tank systems 10A to 10C, the failure determination units 98, 128, 156 may determine that the fuel supply SW 28 has an abnormality when no input time period during which the open signal Sa is not inputted to the ECU 32 is longer than the failure determination times Tb, Td, Tf with the fuel supply SW 28 on during turn-off of the IGSW 12, and the failure detection flag setting units 100, 158 may set the failure detection flag.

Thus, fixed OFF state abnormality of the fuel supply SW 28 can be reliably detected (determined). Here, the fixed OFF state abnormality is an abnormal condition in which the open signal Sa is not inputted to the ECU 32, 120, 150 because, for example, the fuel supply SW 28 is fixed to OFF state, wiring of the fuel supply SW 28 is disconnected, or wiring of the fuel supply SW 28 is short-circuited.

In order to detect such a fixed OFF state abnormality, for example, a switch detection unit such as a photointerrupter may be provided which can detect ON state of the fuel-supply SW 28. Thus, for example, in the first embodiment, when the IGSW 12 is turned off with ON state of the fuel supply SW 28 detected by the switch detection unit, and the open signal Sa not inputted to the ECU 32, the SOAK time T2 measured by the SOAK time measurement circuit 94 corresponds to the above-mentioned no input time period. In other embodiments, when the switch detection unit is provided, the no input time period can be measured, too.

For determination of fixed OFF state abnormality, for example, a redundant circuit may be used. That is to say, fixed OFF state abnormality can be determined when a predetermined time or more elapses with the open signal Sa being inputted to the redundant circuit but not being inputted to the ECU 32, 120, 150.

In the above-described embodiments, the ECU 32 may detect a failure (abnormality) of various switches (a switch for opening or closing an electric slide door, and a parking brake switch for operating an electric parking brake) other than the fuel supply SW 28 to be operated while the IGSW 12 is off, by using a technique similar to the above-described technique for detecting a failure of the fuel supply SW 28.

I claim:

1. A fuel tank system, comprising:
   a fuel tank storing fuel;
   a lid member closing a fuel supply port of the fuel tank;
   a fuel supply switch for opening the lid member and outputting an open signal when the fuel supply switch is on; and
   a controller controlling and allowing the lid member to be opened based on the open signal outputted from the fuel supply switch,
   wherein the controller includes:
      a main control unit controlling a power unit of a vehicle,
      a switching control unit interrupting an electric connection between an electric power supply and the main control unit when an ignition switch is turned off, the ignition switch operating to start and stop the power unit of the vehicle,
      a first timer measuring an input time period and no input time period while the ignition switch is off, the input time period being a time period during which the open signal is continuously inputted to the controller, the no input time period being a time period during which the open signal is not inputted to the controller while the fuel supply switch is on, and
      a failure determination unit determining that the fuel supply switch has a failure when a measured time period by the first timer is longer than a first threshold time period.

2. The fuel tank system according to claim 1,
   wherein the controller includes a second timer measuring the input time period of the open signal while the ignition switch is on or the no input time period while the ignition switch is on,
   when the ignition switch is turned off before a measured time period by the second timer reaches a second threshold time period, the switching control unit delays the interruption of the connection until the measured time period reaches the second threshold time period, and the failure determination unit determines that the fuel supply switch has an failure when the measured time period by the second timer is longer than the second threshold time period.

3. The fuel tank system according to claim 2, wherein the controller includes an insufficient time calculation unit calculating an insufficient time of the measured time period by the second timer with compared to the second threshold time period when the ignition switch is turned off, and the controller sets the calculated insufficient time as an extension time for the switching control unit to delay the interruption after the ignition switch is turned off.

4. The fuel tank system according to claim 1, wherein the controller includes a second timer measuring the input time period of the open signal while the ignition switch is on or the no input time period while the ignition switch is on, and in the case where the ignition switch is turned off before a measured time period by the second timer reaches a second threshold time period, the failure determination unit determines that the fuel supply switch has an failure when a total measured time period of the measured time period by the first timer and the measured time period by the second timer measured immediately after the turn off of the ignition switch is longer than a third threshold time period.

5. The fuel tank system according to claim 1, wherein, after the fuel supply switch is determined to have a failure, the main control unit determines that the fuel supply switch is normal in the case where the open signal is not inputted to the controller when the ignition switch is again turned on.

6. The fuel tank system according to claim 1, wherein the failure determination unit is included in the main control unit.

7. The fuel tank system according to claim 1, wherein the first timer is electrically connected to the electric power supply and supplied power while the ignition switch is off.

8. The fuel tank system according to claim 2, wherein the second timer is electrically connected to the electric power supply and supplied power while the ignition switch is off.

9. A fuel tank system, comprising:

a fuel tank storing fuel;

a lid member closing a fuel supply port of the fuel tank;

a fuel supply switch for opening the lid member and outputting an open signal when the fuel supply switch is on; and a controller controlling and allowing the lid member to be opened based on the open signal outputted from the fuel supply switch, wherein the controller includes:

a main control circuit controlling a power unit of a vehicle, a switching control circuit interrupting an electric connection between an electric power supply and the main control circuit when an ignition switch is turned off, the ignition switch operating to start and stop the power unit of the vehicle, a first timer circuit measuring an input time period and no input time period while the ignition switch is off, the input time period being a time period during which the open signal is continuously inputted to the controller, the no input time period being a time period during which the open signal is not inputted to the controller while the fuel supply switch is on, and a failure determination circuit determining that the fuel supply switch has a failure when a measured time period by the first timer circuit is longer than a first threshold time period.

* * * * *